UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

PURIFICATION OF CRUDE SYNTHETIC CAMPHOR.

1,401,709.  Specification of Letters Patent.  Patented Dec. 27, 1921.

No Drawing.   Application filed February 25, 1920.  Serial No. 361,353.

*To all whom it may concern:*

Be it known that I, JOHANNES M. KESSLER, a citizen of the United States, and a resident of West Orange, in the county of Essex and State of New Jersey, have invented a certain new and useful Purification of Crude Synthetic Camphor, of which the following is a specification.

This invention relates to the purification of synthetic camphor, and especially of camphor contaminated with organic halids, and comprises heating the impure camphor with high boiling point-organic-acid salts soluble in molten camphor.

In the manufacture of synthetic camphor from turpentine, the formation of pinene hydrohalid such as pinene hydrochlorid, is usually one of the first operations to be carried out. Although it is relatively easy to convert this latter substance into camphene and from there into borneol and finally into camphor small amounts of organic halids, such for example as colophene chlorid, etc., are tenaciously retained throughout the different stages of the manufacture and their removal from the final product was found impossible in some cases or could only be accomplished with considerable difficulty by expensive purification processes. Quite often the lack of proper refining methods was the main reason why synthetic camphor contaminated with traces of organic chlorids, but otherwise showing the same valuable properties as the natural product, could not be employed for most commercial purposes. The amount of organic chlorids present in the synthetic camphor may have been less than 1% and still such a product was liable to gradually split off free hydrochloric acid and so cause serious trouble whenever employed. Particularly serious and objectionable was the behavior of such synthetic camphor when it occurred in nitrocellulose plastics such as celluloid, pyralin, etc., which consist of approximately 70% nitrocellulose and 30% camphor. Discoloration of the more delicately colored compounds, instability and consequent decomposition of the nitrocellulose were likely to be caused by the splitting off of the hydrochloric acid.

The chief difficulty which is ordinarily encountered in the refining of synthetic camphor by dry distillation, is the development of free hydrochloric acid and oily, yellow colored, acid reacting liquid which condenses on the sides of the chamber into which the camphor vapor is led, and by dropping into the main portion of the properly refined product contaminates it. The presence of free hydrochloric acid is not only very objectionable on account of its destructive action on the metal lined camphor subliming chambers, but is apt to cause very serious other damages by starting discoloration, instability, and consequent decomposition of the nitrocellulose when the latter is made into plastics with camphor containing it.

In my application, Serial No. 351,936 filed January 16, 1920, for process of purifying crude synthetic camphor, I have described a process whereby a satisfactory product, free from chlorin, can be obtained, this process comprising baking the crude camphor at a temperature above 190° C. until the organic chlorids are decomposed. The time required, 20 to 30 hours, to complete this reaction is, however, unusually long, and attempts were made to shorten the process as much as possible. The most probable solution of this problem appeared to lie in the addition of a reagent.

It was found by experience that reagents were to be avoided which, like alpha-napthyl-amin, imparted an objectionable color to the camphor distillate; and further, that, as a rule, those reagents were unsuitable which were insoluble in molten camphor, such reagents tending to form a hard and difficultly removable mass in the bottom of the retort.

One class of substances which, I discovered, give very satisfactory results are the salts of the higher fatty acids and especially the salts of these acids with an alkaline earth metal, zinc, lead, or other relatively heavy metal, which are readily soluble in molten camphor. Such salts appear to accelerate the decomposition of the organic chlorids and to bind the chlorin or the chlorin derivative which results from this decomposition. Furthermore such salts do not cake in the bottom of the retort and can be removed therefrom without difficulty when distillation of the camphor is completed.

In general I have found that the salt employed should be soluble in molten camphor, and that the organic acid which is formed from the salt hydrolysis should be substantially non-volatile under the conditions under which the camphor is to be distilled, these conditions, ordinarily, being atmospheric pressure and a temperature of about 205° C. It is, furthermore, desirable that the metal radical of said salt be capable of combining with the halogen in the camphor to form a metal halid which is insoluble in molten camphor, thereby lessening the danger of secondary reactions between the metal halid and the complex terpene compounds present.

The salts which I have found particularly satisfactory, due both to their low cost, as compared with the higher fatty acid salts above mentioned, and to their efficacious halogen-binding action, are the metal resinates. These resinates are completely soluble in molten camphor, and the resinic (or abietic) acid from which they are derived does not vaporize appreciably at the temperature at which the camphor is distilled.

For the metal radical of the organic acid salt, I have found that lead is, in general, preferable to calcium and zinc. Fused lead resinate, especially prepared from a high boiling rosin and red lead or litharge, and heated especially high during preparation so that the final product would not give off during the distillation of the camphor any low boiling substances, gives exceptionally good results.

The baking temperature employed should preferably be above 190° C., a temperature range of from 225 to 240° C. being advantageous.

The following data are typical of the results obtained with purifiers of the kind described above. Baking of the dry crude synthetic camphor containing from 0.5 to 0.6% chlorin in an iron retort with 3% fused lead resinate and distilling the reaction product gave results as follows:

3 hrs. at 190° C. (no pressure) left .60% chlorin in the refined product; 3 hrs. at 205° C. (slight pressure) left .30% chlorin in the refined product; and 3 hrs. at 230—240° C. (20—30 lbs. pressure) left .00% chlorin in the refined product.

Of the salts other than the resinates, there can be used to advantage the palmitates, stearates, and oleates of the above mentioned metals, and particularly of lead. Linoleates acted similarly but imparted a disagreeable odor to the refined camphor.

As an example of carrying out my invention, crude synthetic camphor thoroughly dried is mixed with 3% of fused lead resinate and heated in a retort for 3 hours up to 230—240° C. After decreasing the temperature in the retort to 210° and reducing slowly the pressure in the retort by opening a valve leading to an air condenser for a few seconds, the camphor is distilled and condensed in large chambers in the usual manner.

Purified synthetic camphor can also be obtained from the properly baked crude product according to methods other than distillation. For example, the baked synthetic camphor may be dissolved in an organic solvent such as ethyl alcohol, naphtha, etc. and crystallized from a hot saturated solution on cooling or from an unsaturated solution on concentration by distillation. Any dirt or insoluble material present in such a solution can be removed by filtration through cloth or other filtering mediums.

Although my invention has been illustrated in detail in the above description, it will be understood that the invention is not restricted to the examples or to the particular temperatures and pressures above set forth, but that many changes can be made therein without departing from the spirit of the invention. Thus, I have mentioned specifically the use of temperatures up to 240° C. and pressures of 20 to 30 pounds, these pressures being such as can be safely used in retorts of ordinary boiler steel plate construction, but my invention includes carrying out the baking operation at higher temperatures and higher pressures up to the point at which the camphor itself begins to decompose.

The function of camphor-soluble organic acid salts as chlorin removers has been emphasized in the above description because of the primary importance of eliminating substances capable of giving rise to free hydrochloric acid. It has been observed, however, that the action of these organic acids is beneficial also in the removal of other impurities, such as nitrogen derivatives, which exist in the camphor.

I claim:

1. The process of purifying camphor containing an organic halid which comprises heating such camphor in the presence of a high boiling point organic acid salt soluble in molten camphor and at a temperature sufficient to bring about decomposition of the organic halid but below that at which camphor itself begins to decompose.

2. The process of purifying camphor containing an organic halid which comprises heating such camphor in the presence of a high boiling point organic acid salt soluble in molten camphor and at a temperature of from about 190 to 240° C.

3. The process of separating organic chlorids from impure camphor containing said chlorid which comprises heating said impure camphor at a temperature of from about 190 to 240° C. in the presence of a lead salt of a higher aliphatic acid.

4. The process of separating organic chlorids from impure camphor containing said chlorids which comprises heating said impure camphor at a temperature of from about 190 to 240° C. and at a pressure substantially above atmospheric pressure in the presence of a lead salt of a higher aliphatic acid.

5. The process of separating organic chlorids from impure camphor containing said chlorids which comprises heating said impure camphor at a temperature of from about 190 to 240° C. in the presence of a resinate of a metal.

6. The process of separating organic chlorids from impure camphor containing said chlorids which comprises heating said impure camphor at a temperature of from about 190 to 240° C. in the presence of lead resinate.

7. The process of separating organic chlorids from impure camphor containing said chlorids which comprises heating said impure camphor at a temperature of from about 190 to 240° C. in the presence of about 3% of lead resinate.

8. The process of separating organic chlorids from impure camphor containing said chlorids which comprises heating said impure camphor at a temperature of from about 230 to 240° C. in the presence of an aliphatic acid salt soluble in molten camphor.

9. The process of separating organic chlorids from impure camphor containing said chlorids which comprises heating said impure camphor at a temperature of from about 230 to 240° C. in the presence of lead resinate.

10. The process of separating organic chlorids from impure camphor containing said chlorids which comprises heating said impure camphor at a temperature of from about 230 to 240° C. in the presence of a lead salt of a higher aliphatic acid for about 3 hours, and then distilling the camphor.

11. The process of separating organic chlorids from impure camphor containing said chlorids which comprises heating said impure camphor at a temperature of from about 230 to 240° C. in the presence of a lead salt of a higher aliphatic acid for about 3 hours, then reducing the temperature to about 210° C., and distilling the camphor under atmospheric pressure.

12. The process of separating organic chlorids from impure camphor containing said cholrids which comprises heating said impure camphor at a temperature of from about 230 to 240° C. in the presence of about 3% of lead resinate for about 3 hours, and distilling the camphor.

13. The process of separating organic chlorids from thoroughly dried impure camphor containing said chlorids which comprises heating said impure camphor at a temperature of from about 190 to 240° C. in the presence of a higher aliphatic acid salt soluble in molten camphor.

14. The process of separating organic chlorids from thoroughly dried impure camphor containing said chlorids which comprises heating said impure camphor at a temperature of from about 230 to 240° C. in the presence of about 8% of a lead salt of a higher aliphatic acid for about 3 hours, and separating the pure camphor from other substances present by distillation under atmospheric pressure.

15. The process of purifying camphor containing an organic halid which comprises heating such camphor in the presence of a salt, soluble in molten camphor, of an organic acid which is substantially non-volatile at 205° C. under atmospheric pressure, the heating of said camphor being carried on at a temperature sufficient to bring about decomposition of the organic halid but below that at which camphor itself begins to decompose.

16. The process of purifying camphor containing an organic halid which comprises heating such camphor in the presence of a salt, soluble in molten camphor, of an organic acid which is substantially non-volatile at 205° C. under atmospheric pressure, the heating of said camphor being carried on at a temperature of from about 225 to 240° C.

17. The process of purifying camphor containing an organic halid which comprises heating such camphor for about 3 hours in a closed chamber in the presence of a salt, soluble in molten camphor, of an organic acid which is substantially non-volatile at 205° C. under atmospheric pressure, the heating of said camphor being carried on at a temperature of from about 225 to 240° C.

18. The process of separating organic chlorids from impure camphor containing said chlorids which comprises heating said camphor at a temperature of from about 225 to 240° C. in the presence of a higher fatty acid salt of a metal capable of combining with chlorid to form a metal chlorid insoluble in molten camphor.

19. The process of separating organic chlorids from impure camphor containing said chlorids which comprises heating said camphor at a temperature of from about 225 to 240° C. in the presence of a resinate of a metal capable of combining with chlorin to form a metal chlorid insoluble in molten camphor.

In testimony whereof I affix my signature.

JOHANNES M. KESSLER.